Dec. 17, 1935.   G. SCHAFFER ET AL   2,024,748
METHOD OF MANUFACTURING GLASSWARE AND APPARATUS THEREFOR
Filed Dec. 11, 1934
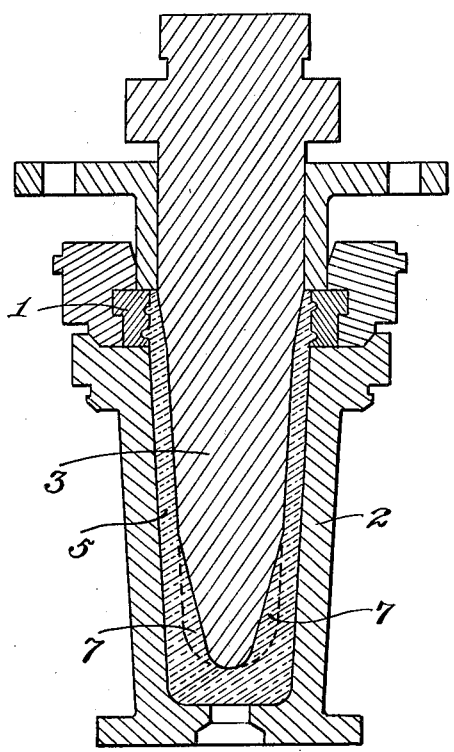
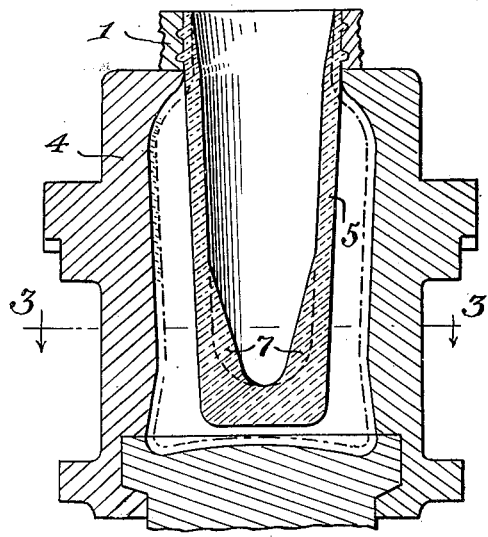
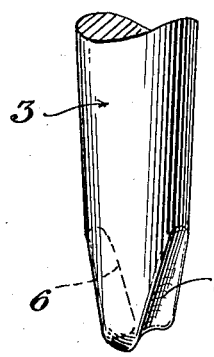
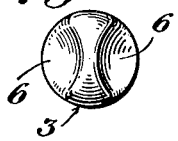
Inventors
Gilbert Schaffer
Guy F. Jardine
By Eccleston & Eccleston
Attorneys Patented Dec. 17, 1935

2,024,748

UNITED STATES PATENT OFFICE 2,024,748

METHOD OF MANUFACTURING GLASSWARE AND APPARATUS THEREFOR

Gilbert Schaffer and Guy F. Jardine, Washington, Pa., assignors to Hazel-Atlas Glass Company, Wheeling, W. Va., a corporation of West Virginia Application December 11, 1934, Serial No. 757,042

8 Claims. (Cl. 49—9)

In the manufacture of glass containers, particularly those of irregular shape, it has heretofore been practically impossible to obtain a uniform thickness of the walls and a uniform thickness of the bottom. In the manufacture of containers which are circular in cross-section the same difficulties are not encountered; and the same is true in the manufacture of some irregular containers where it is possible to shape the parison to substantially the final shape of the irregular container. But for obvious reasons it is usually not practical to shape the parison to substantially the form of the finished irregular container, and the general practice is to have the parison mold and shaping plunger circular in cross-section even though the finished article is to have a cross-sectional shape other than circular. The present invention relates to that practice, and its object is to provide a method and apparatus by which circular parisons are blown into irregular shaped containers having walls and bottom of uniform thickness.

The numerous advantages of the invention will be apparent to those skilled in the art, from the following detailed description when taken in connection with the accompanying drawing; in which, Figure 1 is a vertical sectional view through a parison mold, neck ring and shaping plunger.

Figure 2 is a vertical sectional view through a blow mold and a formed parison suspended therein; the final shape of the glass container being indicated by dot and dash lines.

Figure 3 is a horizontal sectional view taken on line 3—3 of Figure 2.

Figure 4 is a perspective view of the lower portion of the shaping plunger; and

Figure 5 is an end view of the shaping plunger.

Referring to the drawing in more detail numeral 1 refers to the usual neck ring, and numeral 2 refers to the usual parison mold, circular in cross-section. The shaping plunger is indicated by numeral 3, and numeral 4 refers to the blow mold.

In the usual practice the parison mold is circular in cross-section and tapered, and the parison shaping plunger is also circular in cross-section and tapered. A charge of glass is dropped into the parison mold 2, and the shaping plunger 3 then descends and forms the parison 5. The plunger and parison mold are then removed, leaving the parison suspended by the neck ring 1; the blow mold is then closed about the parison, and a blow-head (not shown) descends and blows the parison to final form. Such conventional practice is satisfactory when the circular parisons are to be blown into circular containers; but it is not satisfactory when the circular parisons are to be blown into non-circular containers.

One of the reasons for this is that with the parison formed with a circular parison mold and circular shaping plunger the resulting circular wall of the parison is of the same thickness throughout in any plane, but in the final blowing the circular wall of the parison must be blown to different extents in order to conform to the non-circular wall of the blow mold. Hence thin spots are present in the final article, particularly in the lower portion thereof. Likewise, to form the bottom of the non-circular article portions of the glass must be blown to different extents, and in the conventional practice the bottom is thick at the center and thin where it is blown the farthest.

In accordance with the present invention these objectionable features are overcome by providing additional masses of more ductile glass at the points where more glass is needed to insure a uniform thickness of the walls of the non-circular container and a uniform thickness of the bottom of the non-circular container.

We accomplish this by forming what might be termed pockets, in the shaping plunger. These pockets may be of various shapes and sizes, but in the particular plunger illustrated the pockets, which are referred to by numeral 6, are in the lower portion of the plunger and are formed by cutting out portions of the plunger on the sides which face in the direction of the longest cross-sectional dimension of the blow mold or finished article. These pockets, in the specific form shown, are curved inwardly; and are tapered downwardly and inwardly.

When the charge of glass is dropped into the parison mold and the shaping plunger descends to form the parison, masses of ductile glass 7 are formed in the pockets 6. By having the pockets curved inwardly, in the specific form shown, the masses 7 are deepest, in any horizontal plane, at the points where the glass must be blown the farthest; and by tapering the pockets downwardly and inwardly the larger portions of the masses 7 are very near the lower end of the parison, where it is available for the blowing of a uniform bottom. It will be understood, of course, that the pockets may vary greatly in shape, size and design, in accordance with the particular ware being manufactured.

The parison having been formed by the pocketed plunger, the parison mold and plunger are removed and the blow mold is closed about the parison suspended by the neck ring. The parison in this position, ready to be blown to final form, is shown in Figures 2 and 3. These figures show clearly the position and shape of the masses of ductile glass 7, and also show, in dot and dash outline, the shape of the finished article. By reference to these figures, it will be apparent how the present method and apparatus insures the blowing of a non-circular container having a bottom and walls of uniform thickness. Air under pressure being admitted to the interior of the parison it is distended to the form of the blow mold, and where the glass is blown the farthest additional glass, which is more ductile, is provided by the masses 7, so that the glass is blown out evenly to form the non-circular or irregular wall of uniform thickness. Likewise, as the bottom of this non-circular or irregular container is blown, the ductile masses supply the glass at the points where the bottom is blown the farthest, so that a bottom of uniform thickness is formed. Or, to state it more generally, the pockets cause the formation of reservoirs of more ductile glass, which reservoirs are so positioned, and are of such shape and size, that when the parison is blown these reservoirs will be drawn upon and supply the proper amount of glass, at the proper points, to insure a wall of uniform thickness and a bottom of uniform thickness.

Having fully described the invention, what we claim is:

1. The method of blowing glass containers non-circular in cross-section, which comprises shaping a parison in a circular parison mold, forming in the interior of the parison an additional mass of glass facing in the direction in which the glass must be blown the farthest, and blowing the parison to form a non-circular container.

2. The method of blowing glass containers non-circular in cross-section, which comprises shaping a parison in a circular parison mold, forming in the interior of the parison additional masses of glass on the line of the major cross-sectional axis of the blow mold, and blowing the parison to form a non-circular container.

3. The method of blowing glass containers of irregular cross-sectional shape, which comprises shaping a parison in a circular parison mold, forming as part of the parison, on the interior thereof, additional masses of ductile glass, the masses facing in the directions which the glass must be blown the farthest, and blowing the parison to form a container of irregular cross-sectional shape.

4. The method of blowing glass containers of non-circular cross-sectional shape which comprises forming reservoirs of ductile glass in the interior of a circular parison and while blowing the parison to its final non-circular form drawing the ductile glass from the reservoirs in the directions the glass is blown the farthest.

5. Apparatus for forming glass containers non-circular in cross-section which includes a parison mold circular in cross-section, a blow mold non-circular in cross-section, and a parison shaping plunger, said plunger having pockets facing in the directions the glass is blown the farthest to form the non-circular container.

6. Apparatus for forming glass containers non-circular in cross-section which includes a parison mold circular in cross-section, a blow mold non-circular in cross-section, and a parison shaping plunger, said plunger having pockets in its lower portion, said pockets gradually deepening toward the lower end of the plunger.

7. Apparatus for forming glass containers non-circular in cross-section which includes a parison mold circular in cross-section, a blow mold non-circular in cross-section, and a parison shaping plunger, said plunger having pockets in its lower portion, said pockets having curved walls.

8. Apparatus for forming glass containers non-circular in cross-section which includes a parison mold circular in cross-section, a blow mold non-circular in cross-section, and a parison shaping plunger, said plunger having pockets in its lower portion, said pockets gradually deepening toward the lower end of the plunger, and the pockets having curved walls.

GILBERT SCHAFFER.
GUY F. JARDINE.